(12) United States Patent
Erez (10) Patent No.: US 7,822,880 B2
(45) Date of Patent: Oct. 26, 2010

(54) USER INTERFACES FOR PERIPHERAL CONFIGURATION

(75) Inventor: Chet Erez, San Jose, CA (US)

(73) Assignee: Konica Minolta Systems Laboratory, Inc., Foster City, CA (US)

( * ) Notice: Subject to any disclaimer, the term of this patent is extended or adjusted under 35 U.S.C. 154(b) by 933 days.

(21) Appl. No.: 11/075,718

(22) Filed: Mar. 10, 2005

(65) Prior Publication Data

US 2006/0206628 A1    Sep. 14, 2006

(51) Int. Cl.
*G06F 3/00* (2006.01)
*G06F 15/177* (2006.01)
*G06F 9/455* (2006.01)

(52) U.S. Cl. ............... 710/8; 711/6; 713/2; 718/1; 718/104

(58) Field of Classification Search .............. 710/8
See application file for complete search history.

(56) References Cited

U.S. PATENT DOCUMENTS

| | | | | |
|---|---|---|---|---|
| 4,939,507 | A * | 7/1990 | Beard et al. | 345/156 |
| 5,508,821 | A * | 4/1996 | Murata | 358/442 |
| 5,905,906 | A * | 5/1999 | Goffinet et al. | 710/8 |
| 5,911,044 | A * | 6/1999 | Lo et al. | 709/203 |
| 5,974,474 | A * | 10/1999 | Furner et al. | 710/8 |
| 6,009,442 | A * | 12/1999 | Chen et al. | 715/205 |
| 6,185,574 | B1 * | 2/2001 | Howard et al. | 707/200 |
| 6,459,499 | B1 * | 10/2002 | Tomat | 358/1.15 |
| 6,798,530 | B1 * | 9/2004 | Buckley et al. | 358/1.13 |
| 7,293,114 | B2 * | 11/2007 | Yashiki et al. | 710/5 |
| 7,634,481 | B2 * | 12/2009 | Harada et al. | 1/1 |
| 2004/0130739 | A1 * | 7/2004 | Adam et al. | 358/1.9 |

OTHER PUBLICATIONS

Virtual Device. Hargrave's Communications Dictionary, Wiley. Copyright 2001 by the Institute of Electrical and Electronics Engineers, Inc. Available at: www.credoreference.com.*
Virtual Drive. Collins Dictionary of Computing. Copyright 2000. Available at: www.credoreference.com.*
RAMdisk or silicon disk or virtual drive. Collins Dictionary of Computing. Copyright 2000. Available at: www.credoreference.com.*
Virtual Device. Webster's New World Computer Dictionary. Copyright 2003. Available at: www.credoreference.com.*
"Using Drag and Drop." Chapter 3 of "Motif User's Guide for Release 2.1". Published by HP, Aug. 1997. Available: http://docs.hp.com/en/B1171-90146/ch03s13.html.*

* cited by examiner

*Primary Examiner*—Henry W Tsai
*Assistant Examiner*—Michael Sun
(74) *Attorney, Agent, or Firm*—Finnegan, Henderson, Farabow, Garrett & Dunner, LLP (57) ABSTRACT

Systems and methods consistent with embodiments of the present invention provide a method for the configuration of peripheral devices. In some methods for configuring peripheral devices, configuration options available for a peripheral device are enumerated and listed as files associated with a virtual drive representing the peripheral device. In some embodiments the files may be given descriptive names related to the configuration options they represent. In some embodiments, icons in a user window may denote the virtual drive, and its associated files and folders. In some methods for configuring peripheral devices, when the icon for a file associated with the virtual drive is dragged onto the icon for the virtual drive, the configuration of the scanning device associated with the virtual drive is automatically changed to match the configuration associated with the file.

33 Claims, 5 Drawing Sheets

FIG. 5

USER INTERFACES FOR PERIPHERAL CONFIGURATION

BACKGROUND

1. Field of the Invention

The present invention relates to the field of graphical user interfaces and in particular, to user interfaces for the configuration of computer peripherals.

2. Description of Related Art

Computer peripherals such as document scanners, printers, and multi-function devices have been used for some time now to facilitate conversion of physical documents into electronic form and vice-versa. For example, a physical document may be scanned and stored in electronic form on a computer. The scanned document is represented, at least initially, as an image comprising of a sequence of pixels. The information contained in each pixel is dependent on the granularity of the scan, which, in turn, depends on the resolution of the scanner. Scanner settings are typically controllable, thus the granularity of a scan may be adjusted until a user is satisfied with the scanned image. In addition to image resolution, users may also specify the format in which a scanned image is captured and stored. For example, a user could specify that an image be scanned as a Joint Photographic Experts Group (JPEG) image, a Tagged Image File Format (TIFF) image, or several other image formats. Users must often also specify color settings, document sizes, document input trays, and a host of other scan parameters before a document can be scanned. Thus, programs that control peripheral devices generally provide a user-interface to control settings on the device. Peripheral devices may also have a default setting so that they are immediately available for use after being turned on. However, if a user wishes to change any of the parameters, or device settings then interaction with multiple device control programs and user-interfaces may be required. Users may be thwarted from configuring devices optimally because of the assortment of settings and options available with peripheral devices, and on account of the multiplicity of control programs needed to effect settings on each device.

A simple, intuitive, and uniform interface to configure peripheral devices would allow users to more effectively utilize the diversity of features available on contemporary peripheral devices.

SUMMARY

In accordance with the present invention, systems and methods for configuring peripheral devices are presented.

In some methods for configuring peripheral devices the peripheral device is represented as a virtual drive on a computer. In some embodiments, the different configurations available for a peripheral device are enumerated and listed as files and/or folders associated with the virtual drive representing the peripheral device. In some embodiments the files and/or folders may be given descriptive names related to the configuration parameters they represent. In some embodiments, icons in a user window may denote the virtual drive, and its associated files and folders. In some methods for configuring peripheral devices, when the icon for a file associated with the virtual drive is dragged onto the icon for the virtual drive, the configuration of the peripheral device associated with the virtual drive is automatically changed to match the configuration associated with the file. These and other embodiments are further explained below with respect to the following figures.

DETAILED DESCRIPTION

In accordance with the present invention, systems and methods for configuring peripheral devices are presented.

In some methods for configuring peripheral devices, the peripheral device is represented as a virtual drive on a computer. In some embodiments, the different configurations available for a peripheral device are enumerated and listed as files and/or folders associated with the virtual drive representing the peripheral device. In some embodiments the files and/or folders may be given descriptive names related to the configuration parameters they represent. In some embodiments, icons in a user window may denote the virtual drive, and its associated files and folders. In some methods for configuring peripheral devices, when the icon for a file associated with the virtual drive is dragged onto the icon for the virtual drive, the configuration of the peripheral device associated with the virtual drive is automatically changed to match the configuration associated with the file. In some embodiments the drag and drop operation may also trigger the operation of the peripheral device in accordance with the user-imparted configuration.

Figure 1:
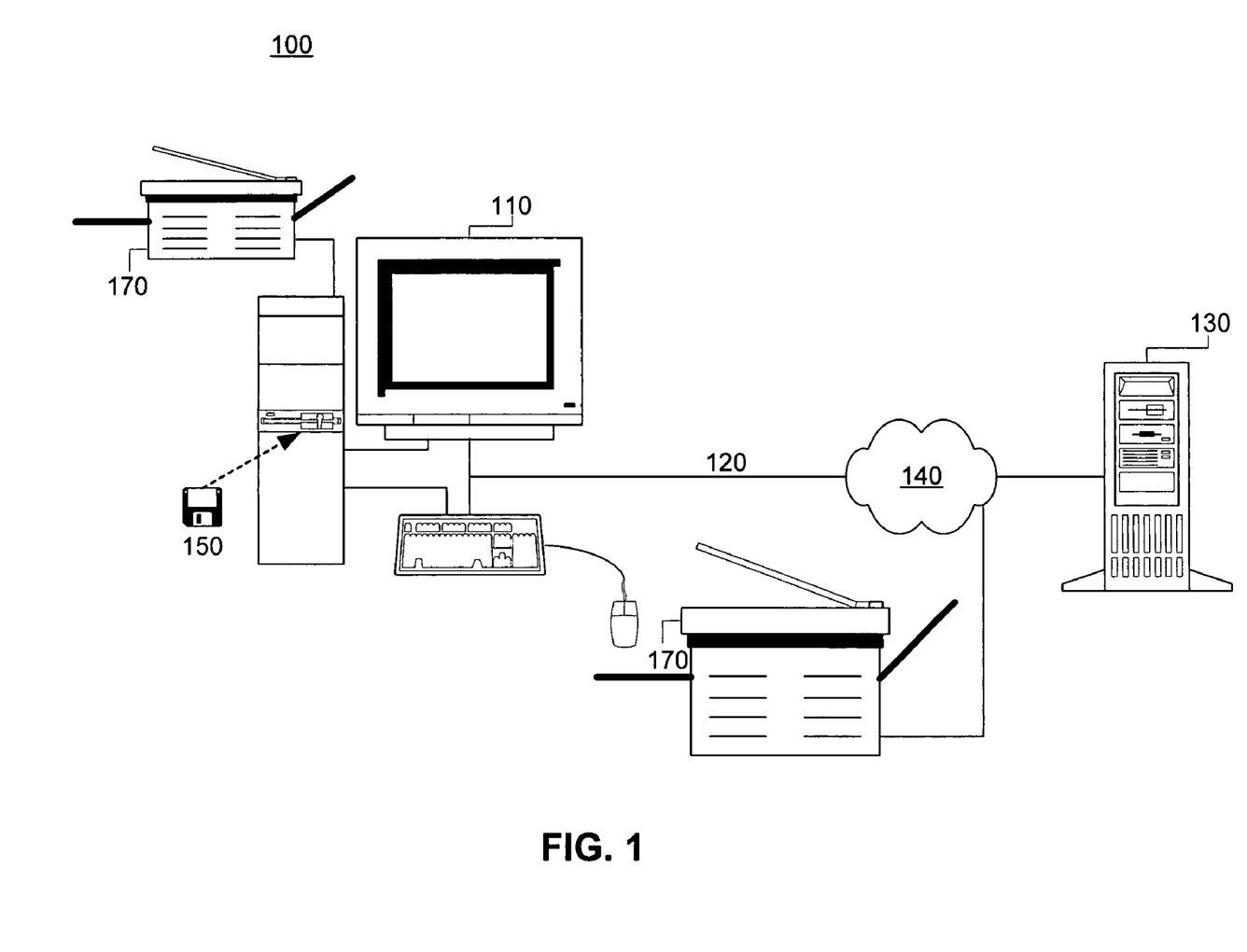
FIG. 1 shows a block diagram of a system for the configuration of peripheral devices according to some embodiments of the invention.

FIG. 1 shows a block diagram of a system for the configuration of peripheral devices according to some embodiments of the invention. A computer software application consistent with the present invention may be deployed on a network of computers, as shown in FIG. 1, that are connected through communication links that allow information to be exchanged using conventional communication protocols and/or data port interfaces.

As shown in FIG. 1, exemplary system 100 includes a computing device 110 and a server 130. Further, computing device 110 and server 130 may communicate over a connection 120, which may pass through network 140, which in one case could be the Internet. Computing device 110 may be a computer workstation, desktop computer, laptop computer, or any other computing device capable of being used in a networked environment. Server 130 may be a platform capable of connecting to computing device 110 and other devices too (not shown). Computing device 110 and server 130 may be capable of executing software (not shown) that allows the control and configuration of peripheral devices, such as exemplary peripheral device 170. Peripheral device 170 may be a scanner, a printer, a multi-function device, or any other device that is capable of being dynamically configured and/or reconfigured.

Computing device 110 also contains removable media drive 150. Removable media drive 150 may include, for example, 3.5 inch floppy drives, CD-ROM drives, DVD ROM drives, CD±RW or DVD±RW drives, USB flash drives, and/or any other removable media drives consistent with embodiments of the present invention. In some embodiments consistent with the present invention, portions of the software application may reside on removable media and be read and executed by computing device 110 using removable media drive 150.

Connection 120 couples computing device 110, server 130, and peripheral device 170 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as Ethernet, ADB, USB, SCSI, FIREWIRE, AAUI, and/or BNC ports for transmission of data through the appropriate connection 120. In some embodiments, connection 120 may be a low-bandwidth connection, for example, a Digital Subscriber Line (DSL), an Asymmetric Digital Subscriber Line (ADSL), or a cable connection. The communication links could be wireless links or wired links or any combination consistent with embodiments of the present invention, that allows communication between computing device 110, server 130, and scanning device 170.

Network 140 could include a Local Area Network (LAN), a Wide Area Network (WAN), or the Internet. In some embodiments consistent with the present invention, information sent over network 140 may be encrypted to ensure the security of the data being transmitted.

Peripheral device 170 is connected to network 140 through connection 120. In some embodiments, peripheral device 170 may also be connected directly to computing device 110 and/or server 130. System 100 may include multiple peripheral devices (not shown), according to embodiments of the invention. Peripheral device 170 may be controlled by software, including device driver software, running on computing device 110 or server 130. In some embodiments, configuration parameters pertaining to peripheral device 170 may be user-configurable. For example, where the peripheral device is a scanner, the resolution, image formats, document sizes, color encoding and other configuration parameters may be user-configurable. A user may also be able to specify input trays and the use of automatic document feeders to allow batch processing of documents. If peripheral device 170 is a printer, paper sizes, output trays, color options, and print resolution, among other options, may be user-configurable. In general, the nature and type of configuration options will depend on the function of the peripheral device and the features available on a specific device. In some embodiments, information transferred to and/or from the peripheral device may be stored on computing device 110 and/or server 130 for additional processing.

A computer software application consistent with the present invention may be deployed on any of the exemplary computers, as shown in FIG. 1. For example, computing device 110 could execute software that may be downloaded directly from server 130.

Figure 2:
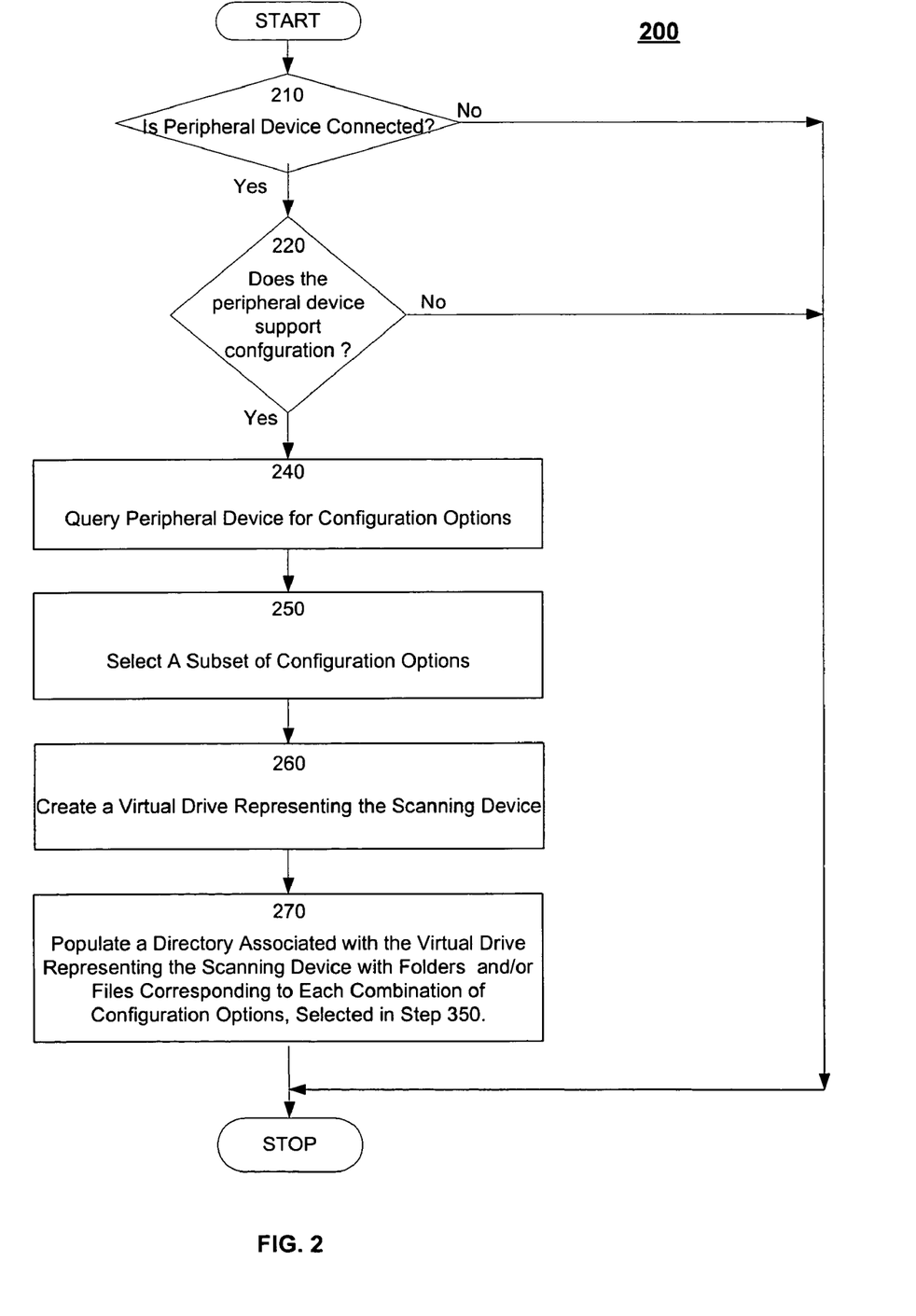
FIG. 2 illustrates a flowchart describing the initialization of a system for the automatic configuration of peripheral devices, according to some embodiments of the invention.

FIG. 2 illustrates a flowchart describing the initialization of a system for the automatic configuration of peripheral devices, according to some embodiments of the invention. In some embodiments, an application implementing steps in flowchart 200 may be executed on computing device 110, or server 130. In step 210, the application determines if peripheral devices are connected to, or may be accessed from the computer. In some embodiments, peripheral devices connected to, or accessible from the computer may be determined by inspecting a list of such devices. In some embodiments, the operating system may be queried, for example, by using a system call to determine the peripheral devices available. If a peripheral device is present, messages may be exchanged with the device to ensure that it is functioning. If no device can be located, or if the application is unable to establish contact with a peripheral device, then the program terminates. If a peripheral device is detected, then messages are sent to the device in step 220 to determine if it is configurable. If the peripheral device is not configurable then the program terminates. If the device is configurable, then, in step 240, the device is queried regarding available configuration options. In some embodiments, the range of available configuration options may be obtained directly from a device driver for the peripheral device through an application programming interface (API). In some embodiments, the device may be directly queried by sending messages to the device and receiving responses from the device using connection 120. In step 250, certain configuration options may be selected for representation in a user-interface according to embodiments of the present invention, from among the many provided by the peripheral device. In some embodiments, options that are likely to be changed frequently by a user may be selected, and used in succeeding steps to establish an intuitive mechanism to configure the peripheral device based on user requirements, according to embodiments of the invention. For example, if the peripheral device is a scanner, then the scan resolution and output image format, which are frequently altered by users, may be selected. In step 260, the peripheral device is added as a virtual drive on the computer executing the algorithm represented by flowchart 200. A virtual drive, allows a device to be represented as a drive on a computer, in a manner similar to hard disk drives, and/or removable media drives. In some embodiments, a virtual drive may be displayed as an icon in a computer, file, or directory management utility provided by the operating system. In some embodiments, a distinct identifiable icon may be provided for each type of peripheral device. For example, in personal computers providing window-based management utilities, such as Microsoft Windows, a peripheral device may appear as an icon in an interface to the desktop and filing system, such as Windows Explorer. In such systems, when a request to the virtual drive is received, the operating system will pass the request to a driver or an application that is associated with the virtual drive, which will then process the request. In step 270, a directory is created, associated with the virtual drive, and populated with files and/or folders corresponding to each combination of configuration options selected in step 250. For example, for a scanner, a file may be created in the directory and associated with a scan resolution of 600 dots per inch ("dpi") and a TIFF output format. In some embodiments, when a file such as the one above, is copied to the virtual drive representing the scanner, the device is configured with the parameters associated with the file, and documents may be scanned by the scanner with a 600 dpi resolution and stored in a TIFF format on the computer.

Figure 3:
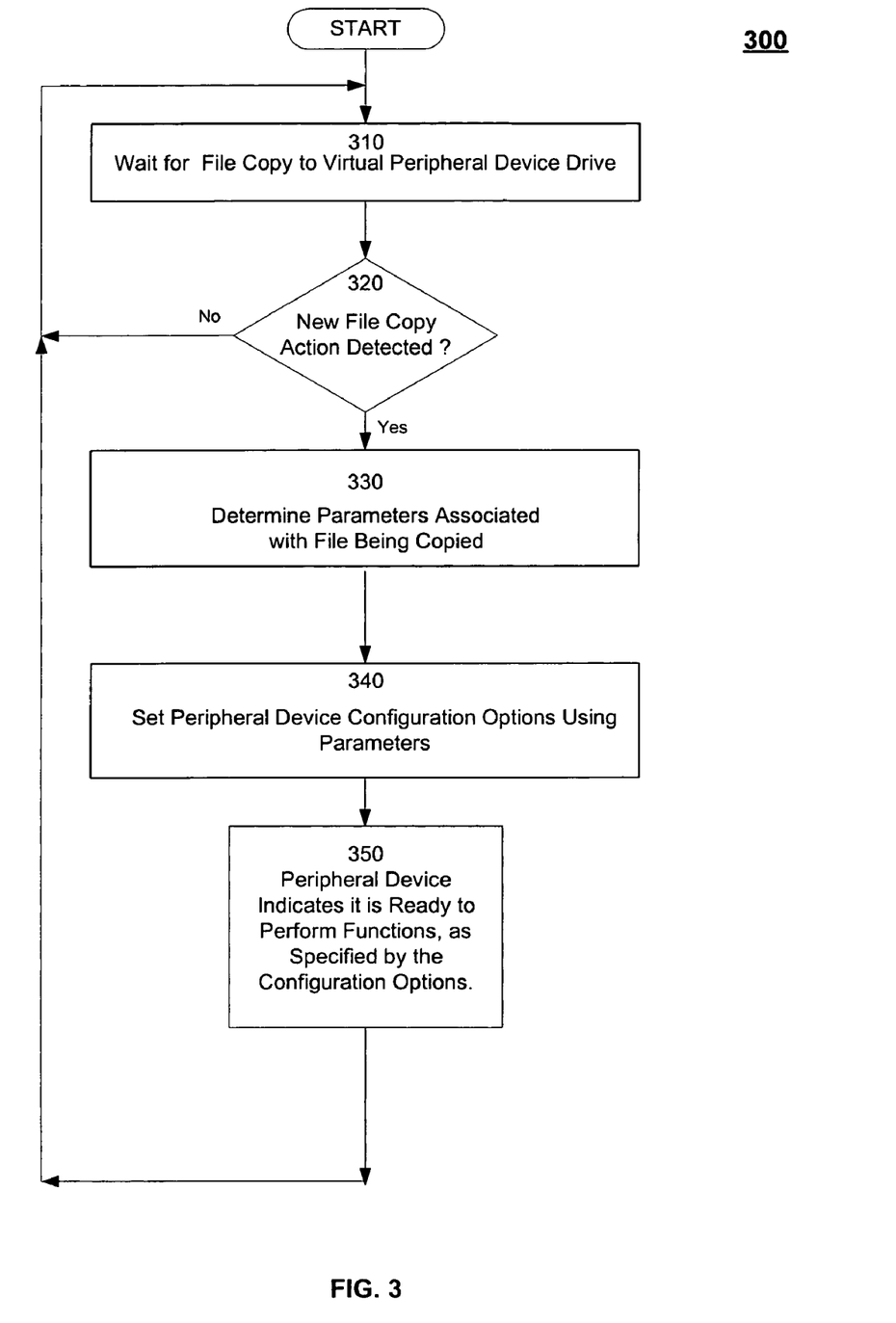
FIG. 3 depicts a flowchart describing the automatic configuration of a peripheral device according to embodiments of the invention.

FIG. 3 depicts a flowchart describing the automatic configuration of a peripheral device according to embodiments of the invention. In some embodiments, an application implementing steps in flowchart 300 may be executed on computing device 110, or server 130. In steps 310 and 320, the application is a wait state, where it waits until it detects a file copy operation to the virtual drive representing the peripheral device. In step 330, when a file copy to the virtual drive is detected, the application determines peripheral device configuration parameters associated with the file being copied. In some embodiments, the configuration parameters may be specified as part of the file name itself. In step 340, the configuration parameters are used to set peripheral options. In some embodiments, configuration parameters in the file, or extracted from the file name may be passed to a device driver, or to peripheral device 170 directly to request configuration of the device as specified by the parameters. Next, in step 350, the peripheral device is ready to operate on its inputs or outputs in the manner specified by the configuration options set in step 340. For example, if the device is a scanner, and the file copied to the virtual drive contains "600dpi_TIFF", as part of its file name then documents may be scanned by the scanning device with a 600 dpi resolution and stored in a TIFF format on the computer. In some embodiments, documents to be scanned may be placed in appropriate input trays on the scanning device. For example, in a production-line environment, a stack of documents placed in an automatic document feeder tray on the scanning device may be scanned using according to specified configuration options with a single file copy operation. If the peripheral device is a printer, then documents sent to the printer subsequent to its configuration, will be printed based on the new configuration settings. In some embodiments, an application implementing the steps of flowchart 400, may be embedded as a plug-in, within the desktop and file management system of a computer.

Figure 4:
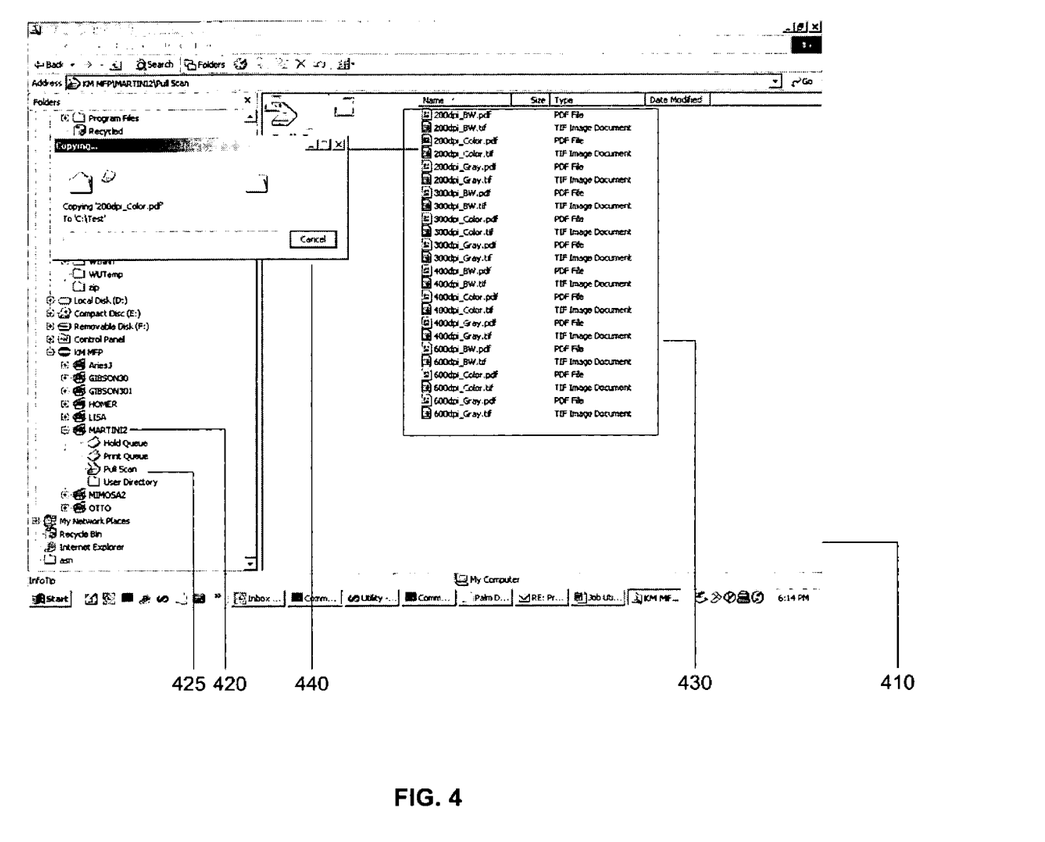
FIG. 4 depicts an exemplary user window with icons representing the components of a system for the automatic configuration of an exemplary scanner, according to some embodiments of the invention.

FIG. 4 depicts a user window 410 with the embedded application and icons representing an exemplary multi-function peripheral device, and files and folders associated with the scanning device according to some embodiments of the invention. Window 410 shows an icon for a virtual drive 420, representing a multi-function peripheral device, which incorporates a scanner. Directory 425 associated with virtual drive 420, contains a list of files 430 with names that suggest the configuration option they represent. In some embodiments, when a user, or an application causes one of files listed in file list 430, to be copied to virtual drive 420, the scanner is configured with the options associated with the file name. Dialog box 440 indicates that the configuration operation is being performed. Documents placed on the appropriate input tray are then scanned and saved on the computer in the specified format. The approach specified above allows peripheral devices to be configured using drag-and-drop operations in an intuitive and uniform manner.

Figure 5:
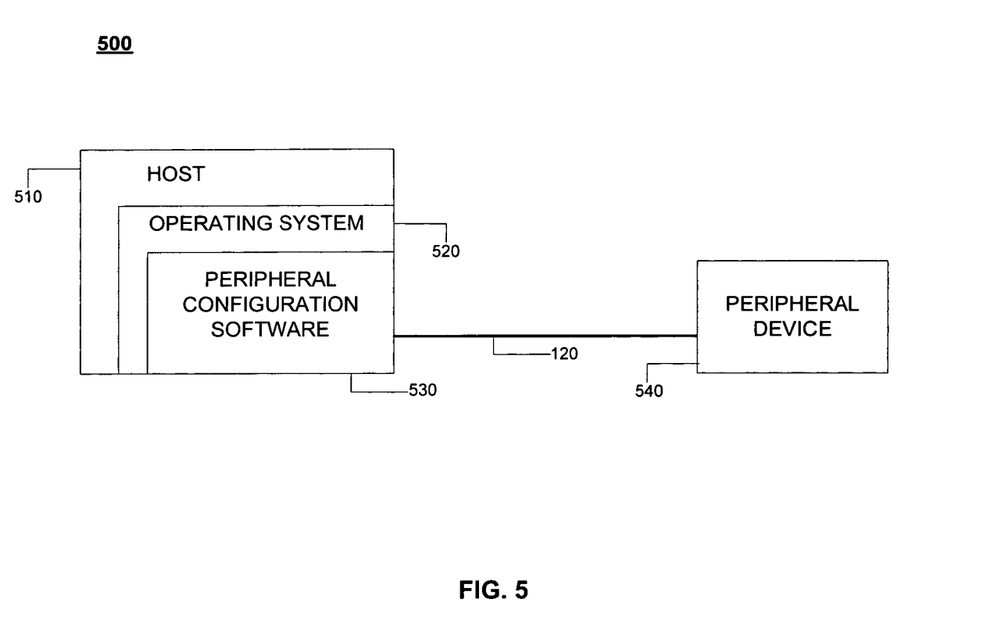
FIG. 5 shows an exemplary system, including a software hierarchy for the configuration of peripheral devices, according to embodiments of the invention.

FIG. 5 shows an exemplary system 500, including a software hierarchy for the configuration of peripheral devices, according to embodiments of the invention. Operating System 520 runs on host 510, which may be computing device 110, or server 130. Operating system 520 also interacts with Peripheral Configuration Software 530, which communicates with Peripheral Device 540 over connection 120. In some embodiments, Peripheral Configuration Software 530 may contain modules, which upon invocation will implement the algorithms depicted in flowcharts 200 and 300. In some embodiments, Operating System 520 may provide a Desktop and File Management System, such as shown in exemplary user window 410. In some embodiments, when an appropriate peripheral device is detected or initialized, Peripheral Configuration Software 530 may supply parameters, or otherwise instruct Operating System 520 to create a virtual drive to represent the peripheral device, and to create files representing peripheral device configuration options associated with the virtual drive. In some embodiments, the virtual drive representing Peripheral Device 540 may be depicted as an icon 420 in a Desktop and File Management System. In some embodiments when a file associated with the virtual drive is copied to the virtual drive, Operating System 520 detects the copy operation and alerts Peripheral Configuration Software 530. Peripheral Configuration Software 530 may then communicate with Peripheral Device 540 to configure Peripheral Device 540 in accordance with configuration parameters associated with or specified in the file being copied. In some embodiments, Peripheral Configuration Software 530 may communicate with, or pass the configuration settings to a device manager, or device driver controlling Peripheral Device to effect changes in the configuration of Peripheral Device 540.

Further, methods consistent with embodiments of the invention may conveniently be implemented using program modules, hardware modules, or a combination of program and hardware modules. Such modules, when executed, may perform the steps and features disclosed herein, including those disclosed with reference to the exemplary flow charts shown in the figures. The operations, stages, and procedures described above and illustrated in the accompanying drawings are sufficiently disclosed to permit one of ordinary skill in the art to practice the invention. Moreover, there are many computers and operating systems that may be used in practicing embodiments of the instant invention and, therefore, no detailed computer program could be provided that would be applicable to these many different systems. Each user of a particular computer will be aware of the language, hardware, and tools that are most useful for that user's needs and purposes.

The above-noted features and aspects of the present invention may be implemented in various environments. Such environments and related applications may be specially constructed for performing the various processes and operations of the invention, or they may include a general-purpose computer or computing platform selectively activated or reconfigured by program code to provide the functionality. The processes disclosed herein are not inherently related to any particular computer or other apparatus, and aspects of these processes may be implemented by any suitable combination of hardware, software, and/or firmware. For example, various general-purpose machines may be used with programs written in accordance with teachings of the invention, or it may be more convenient to construct a specialized apparatus or system to perform the required methods and techniques.

Embodiments of the present invention also relate to computer-readable media that include program instructions or program code for performing various computer-implemented operations based on the methods and processes of embodiments of the invention. The program instructions may be those specially designed and constructed for the purposes of the invention, or they may be of the kind well known and available to those having skill in the computer software arts. Examples of program instructions include, for example, machine code, such as produced by a compiler, and files containing a high-level code that can be executed by the computer using an interpreter.

Other embodiments of the invention will be apparent to those skilled in the art from consideration of the specification and practice of the embodiments of the invention disclosed herein. It is intended that the specification and examples be considered as exemplary only, with a true scope and spirit of the invention being indicated by the following claims. As such, the invention is limited only by the following claims.

The invention claimed is:

1. A method for representing configuration options available on a peripheral device coupled to a computer, the method comprising:

determining the availability of the peripheral device;

querying the peripheral device regarding available configuration options;

selecting a subset of the available configuration options;

representing the peripheral device as a virtual drive;

creating a plurality of files associated with the virtual drive, wherein each of the plurality of files represents a distinct combination of the selected configuration options and the file name of each file indicates the selected configuration combination associated with the file; and displaying the file names and an iconic representation of the plurality of files in conjunction with the display of the virtual drive in a file manager on the computer, wherein the peripheral device is set up to reflect selected configuration options when the user copies a file in the plurality of files to the virtual drive by moving the icon corresponding to the file to the icon corresponding to the virtual drive.

2. The method of claim 1, wherein the peripheral device is a scanner.

3. The method of claim 1, wherein determining the availability of the peripheral device comprises examining a list of accessible peripheral devices.

4. The method of claim 1, wherein querying the peripheral device regarding available configuration options further comprises:

sending messages to the peripheral device requesting available configuration options in accordance with a protocol supported by the device;

receiving responses to the sent messages from the peripheral device; and determining the configuration options available on the peripheral device based on information contained in the responses received from the peripheral device.

5. The method of claim 1, wherein querying the peripheral device regarding available configuration options further comprises:

sending messages to a device manager for the peripheral device;

receiving responses to the sent messages from the device manager; and determining the configuration options available on the peripheral device based on information contained in the responses received from the device manager.

6. The method of claim 1, wherein the subset of configuration options selected consists of frequently used user configurations.

7. The method of claim 1, further comprising:

configuring the peripheral device in accordance with the selected configuration combination when the at least one file is copied to the virtual drive.

8. A method for configuring a peripheral device represented as a virtual drive comprising:

selecting at least one of a plurality of files associated with the virtual drive, wherein each file in the plurality of files represents a distinct combination of configuration parameters for the peripheral device and the file name of each file in the plurality of files indicates the configuration combination represented by the file;

detecting the initiation of a file copy to the virtual drive of the selected file; and configuring the peripheral device based on the configuration parameters associated with the selected file.

9. The method of claim 8, wherein the peripheral device is a scanner.

10. The method of claim 8, wherein configuring the peripheral device based on the configuration parameters further comprises sending a message to the device to change the configuration of the device in accordance with a protocol supported by the device.

11. The method of claim 8, wherein configuring the peripheral device based on the configuration parameters further comprises sending a message with options to change the configuration of the device to a device manager for the device.

12. A non-transitory computer-readable medium that stores instructions, which when executed by a computer perform steps in a method for representing configuration options available on a peripheral device coupled to a computer, the steps comprising:

determining the availability of a peripheral device;

querying the peripheral device regarding available configuration options;

selecting a subset of the available configuration options;

representing the peripheral device as a virtual drive;

creating a plurality of files associated with the virtual drive, wherein each file in the plurality of files represents a distinct combination of the selected configuration options and the file name of each file indicates the selected configuration combination associated with the file; and displaying the file names and an iconic representation of the plurality of files in conjunction with the display of the virtual drive in a file manager on the computer, wherein the peripheral device is set up to reflect the selected configuration options when the user copies a file in the plurality of files to the virtual drive by moving the icon corresponding to the file to the icon corresponding to the virtual drive.

13. The non-transitory computer-readable medium of claim 12, wherein querying the peripheral device regarding available configuration options further comprises:

sending messages to the peripheral device requesting available configuration options in accordance with a protocol supported by the device;

receiving responses to the sent messages from the peripheral device; and determining the configuration options available on the peripheral device based on information contained in the responses received from the peripheral device.

14. The non-transitory computer-readable medium of claim 12, wherein querying the peripheral device regarding available configuration options further comprises:

sending messages to a device manager for the peripheral device;

receiving responses to the sent messages from the device manager; and determining the configuration options available on the peripheral device based on information contained in the responses received from the device manager.

15. The computer-readable medium of claim 12, further comprising:

configuring the peripheral device in accordance with the selected configuration combination when the at least one file is copied to the virtual drive.

16. A non-transitory computer-readable medium that stores instructions, which when executed by a computer perform steps in a method for configuring a peripheral device represented as a virtual drive, the steps comprising:

selecting at least one of a plurality of files associated with the virtual drive, wherein each file in the plurality of files represents a distinct combination of configuration parameters for the peripheral device and the file name of each file in the plurality of files indicates the configuration combination represented by the file;

detecting the initiation of a file copy to the virtual drive of the selected file; and configuring the peripheral device based on the configuration parameters associated with the selected file.

17. The non-transitory computer-readable medium of claim 16, wherein configuring the peripheral device based on the configuration parameters further comprises sending a message to the device to change the configuration of the device in accordance with a protocol supported by the device.

18. The non-transitory computer-readable medium of claim 16, wherein configuring the peripheral device based on the configuration parameters further comprises sending a message to change the configuration of the device to a device manager for the device.

19. A computer processor executing instructions that perform steps in a method for representing configuration options available on a peripheral device coupled to the computer, the steps comprising:
   determining the availability of the peripheral device;
   querying the peripheral device regarding available configuration options;
   selecting a subset of the available configuration options;
   representing the peripheral device as a virtual drive;
   creating a plurality of files associated with the virtual drive, wherein each of the plurality of files represents a distinct combination of the selected configuration options and the file name of each file indicates the selected configuration combination associated with the file; and
   displaying the file names and an iconic representation of the plurality of files in conjunction with the display of the virtual drive in a file manager on the computer, wherein the peripheral device is set up to reflect the selected configuration options when the user copies a file in the plurality of files to the virtual drive by moving the icon corresponding to the file to the icon corresponding to the virtual drive.

20. The processor of claim 19, further comprising:
   configuring the peripheral device in accordance with the selected configuration combination when the at least one file is copied to the virtual drive.

21. A computer processor executing instructions that perform steps in a method for configuring a peripheral device represented as a virtual drive, the steps comprising:
   selecting at least one of a plurality of files associated with the virtual drive, wherein each file in the plurality of files represents a distinct configuration of configuration options for the peripheral device and the file name of each file in the plurality of files indicates the configuration combination represented by the file;
   detecting the initiation of a file copy to the virtual drive of the selected file; and
   configuring the peripheral device based on the configuration parameters associated with the selected file.

22. A computer readable memory containing instructions for controlling a computer system to perform steps in a method for representing configuration options available on a peripheral device coupled to a computer, the steps comprising:
   determining the availability of the peripheral device;
   querying the peripheral device regarding available configuration options;
   selecting a subset of the available configuration options;
   representing the peripheral device as a virtual drive;
   creating a plurality of files associated with the virtual drive, wherein each of the plurality of files represents a distinct combination of the selected configuration options and the file name of each file specifies the selected configuration combination associated with the file; and
   displaying the file names and an iconic representation of the plurality of files in conjunction with the display of the virtual drive in a file manager on the computer, wherein the peripheral device is set up to reflect the selected configuration options when the user copies a file in the plurality of files to the virtual drive by moving the icon corresponding to the file to the icon corresponding to the virtual drive.

23. The computer-readable memory of claim 22, further comprising:
   configuring the peripheral device in accordance with the selected configuration combination when the at least one file is copied to the virtual drive.

24. A computer readable memory containing instructions for controlling a computer system to perform steps in a method for configuring a peripheral device represented as a virtual drive, the steps comprising:
   selecting at least one of a plurality of files associated with the virtual drive, wherein each file in the plurality of files represents a distinct combination of configuration parameters for the peripheral device and the file name of each file in the plurality of files indicates the configuration combination represented by the file;
   detecting the initiation of a file copy to the virtual drive of the selected file; and
   configuring the peripheral device based on the configuration parameters associated with the selected file.

25. A computer system, including at least one configurable peripheral, configured to perform steps in method for representing configuration options available on a peripheral device coupled to a computer, the steps comprising:
   determining the availability of the at least one configurable peripheral device;
   querying the at least one configurable peripheral device for configuration options;
   selecting a subset of the configuration options;
   representing the at least one configurable peripheral device as a virtual drive;
   creating a plurality of files associated with the virtual drive, wherein each of the plurality of files represents a distinct combination of the selected configuration options and the file name of each file indicates the selected configuration combination associated with the file; and
   displaying the file names and an iconic representation of the plurality of files in conjunction with the display of the virtual drive in a file manager on the computer, wherein the peripheral device is set up to reflect the selected configuration options when the user copies a file in the plurality of files to the virtual drive by moving the icon corresponding to the file to the icon corresponding to the virtual drive.

26. The computer system of claim 25, further comprising:
   configuring the peripheral device in accordance with the selected configuration combination when the at least one file is copied to the virtual drive.

27. A computer system, including at least one configurable peripheral represented as a virtual drive coupled to a computer, wherein the system performs steps in method for configuring the at least one peripheral device, the steps comprising:
   selecting at least one of a plurality of files, wherein each file in the plurality of files represents a distinct combination of configuration options for the peripheral device and the file name of each file in the plurality of files indicates the configuration combination represented by the file;
   detecting the initiation of a file copy to the virtual drive of the selected file; and configuring the peripheral device based on the configuration parameters associated with the selected file.

28. A method for configuring an image scanner in a system comprising at least one computer coupled to at least one image scanner wherein the scanner is represented as a virtual drive on the computer, the method comprising:

selecting at least one of a plurality of files associated with the virtual drive, wherein each file represents a distinct combination of scanner configuration parameters and the file name of each file in the plurality of files indicates the configuration combination represented by each file;

detecting the initiation of a file copy to the virtual drive of the selected file; and configuring the scanner based on the configuration parameters associated with the selected file.

29. The method of claim 28, wherein associating files representing scanner configuration options with the virtual drive further comprises:

querying the scanner for configuration options;

selecting a subset of the configuration options; and populating a directory associated with the virtual drive with files, wherein each file represents a configuration combination that is specified as part of the file name.

30. The method of claim 28, wherein the selected scanner configuration options comprise at least one of output data format, bit depth, or scan resolution.

31. The method of claim 28, wherein the configuration parameters include a directory on the personal computer where scanned data is stored.

32. The method of claim 28, wherein configuring the scanner based on the configuration parameters further comprises sending an instruction to the scanner to start the scanning operation.

33. The method of claim 28, further comprising:

configuring the image scanner in accordance with the selected configuration combination when the at least one file is copied to the virtual drive.

* * * * *